(12) United States Patent
Ovshinsky et al.

(10) Patent No.: US 7,388,825 B2
(45) Date of Patent: *Jun. 17, 2008

(54) OPTICAL DATA STORAGE AND RETRIEVAL SYSTEMS UTILIZING DUAL ENERGY SOURCES

(75) Inventors: Stanford R. Ovshinsky, Bloomfield Hills, MI (US); David Strand, Bloomfield Township, MI (US); David Tsu, Auburn Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/477,704

(22) Filed: Jun. 29, 2006

(65) Prior Publication Data

US 2006/0280043 A1 Dec. 14, 2006

Related U.S. Application Data

(62) Division of application No. 10/232,355, filed on Aug. 30, 2002, now Pat. No. 7,113,474.

(60) Provisional application No. 60/316,566, filed on Sep. 1, 2001.

(51) Int. Cl.
*G11B 7/24* (2006.01)
*G11B 7/00* (2006.01)

(52) U.S. Cl. .............. 369/275.2; 369/53.2; 369/100
(58) Field of Classification Search .. 369/275.1–275.5, 369/53.2, 100, 111, 13.35, 13.02, 112.23; 428/64.1, 64.4; 430/270.13
See application file for complete search history.

(56) References Cited

U.S. PATENT DOCUMENTS

| | | | | | |
|---|---|---|---|---|---|
| 4,773,060 | A | * | 9/1988 | Shimada et al. | 369/100 |
| 5,128,099 | A | * | 7/1992 | Strand et al. | 420/579 |
| 5,935,672 | A | * | 8/1999 | Zhou et al. | 428/64.1 |
| 6,011,757 | A | * | 1/2000 | Ovshinsky | 369/13.35 |
| 6,646,744 | B2 | * | 11/2003 | Pedersen et al. | 356/445 |

\* cited by examiner

*Primary Examiner*—Ali Neyzari
(74) *Attorney, Agent, or Firm*—Frederick A. Krieger

(57) ABSTRACT

An optical data storage and retrieval system that includes a phase change storage medium and dual energy sources. The phase change material may store information by undergoing a transformation from one structural state to another structural state through application of energy. The system is equipped with two energy sources, neither of which alone provides sufficient energy to effect the transformation. The combination of both energy sources, however, provides sufficient energy to induce the transformation needed to record information. The energy from either source may be optical, thermal, electromagnetic, mechanical or magnetic energy.

16 Claims, 10 Drawing Sheets

Field Enhanced Optical / Electronic Recording

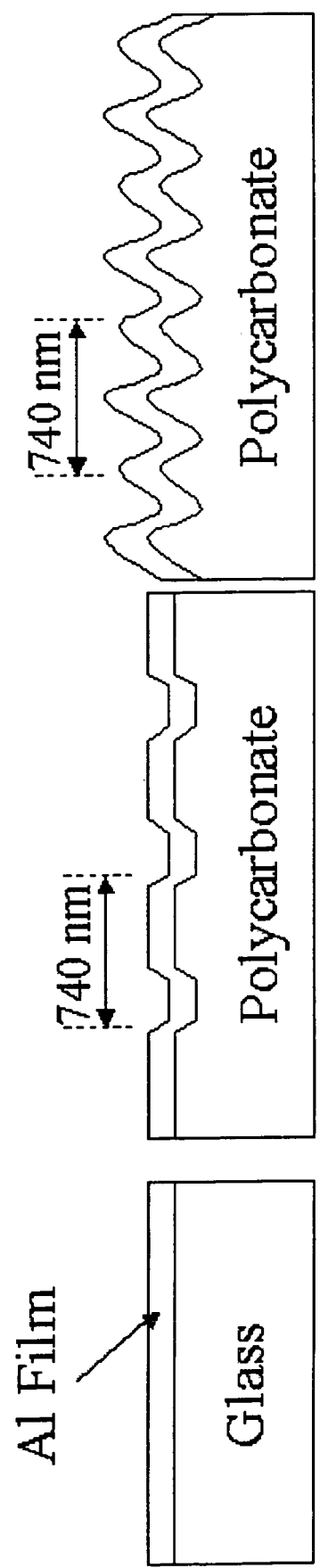

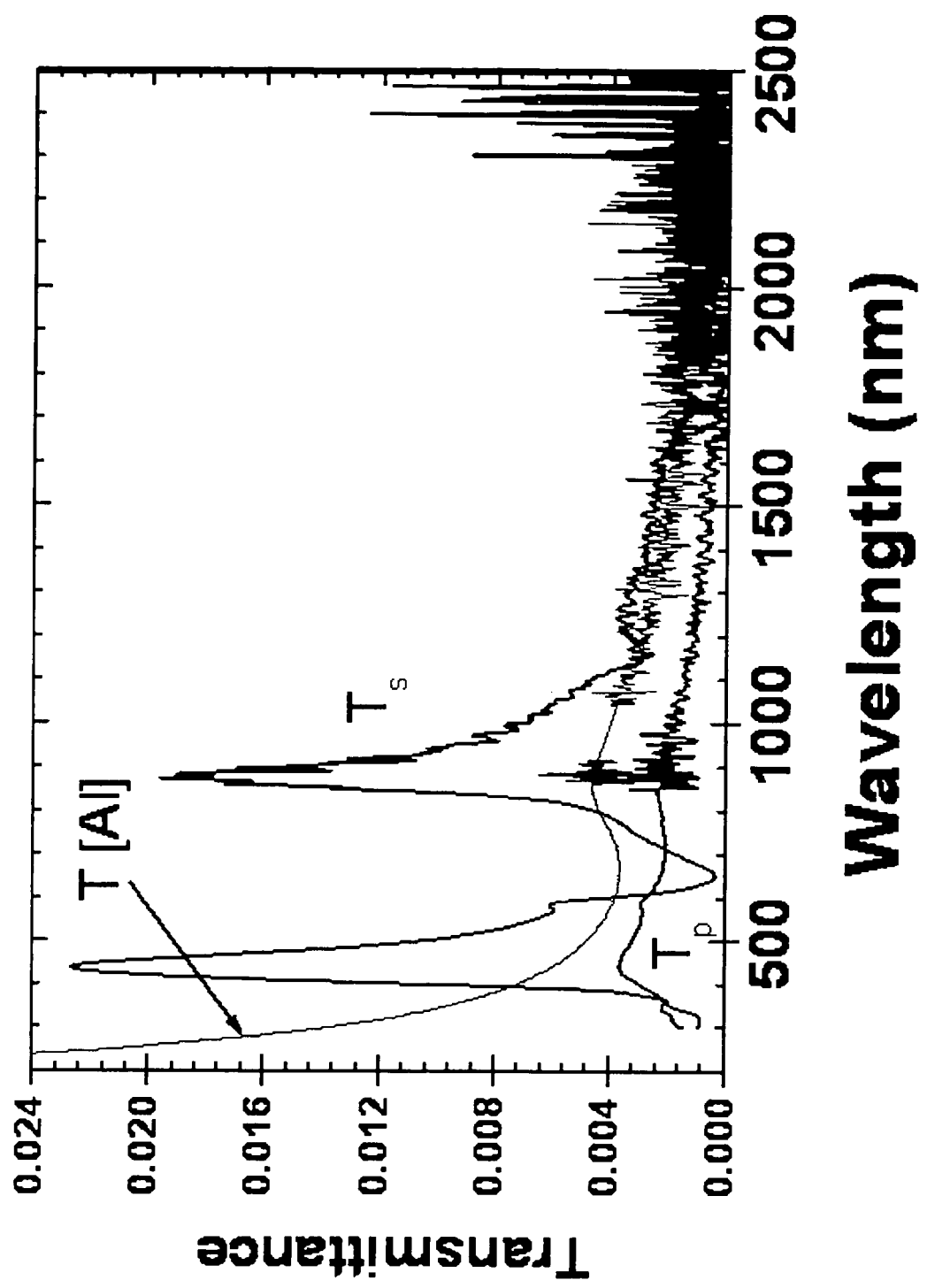

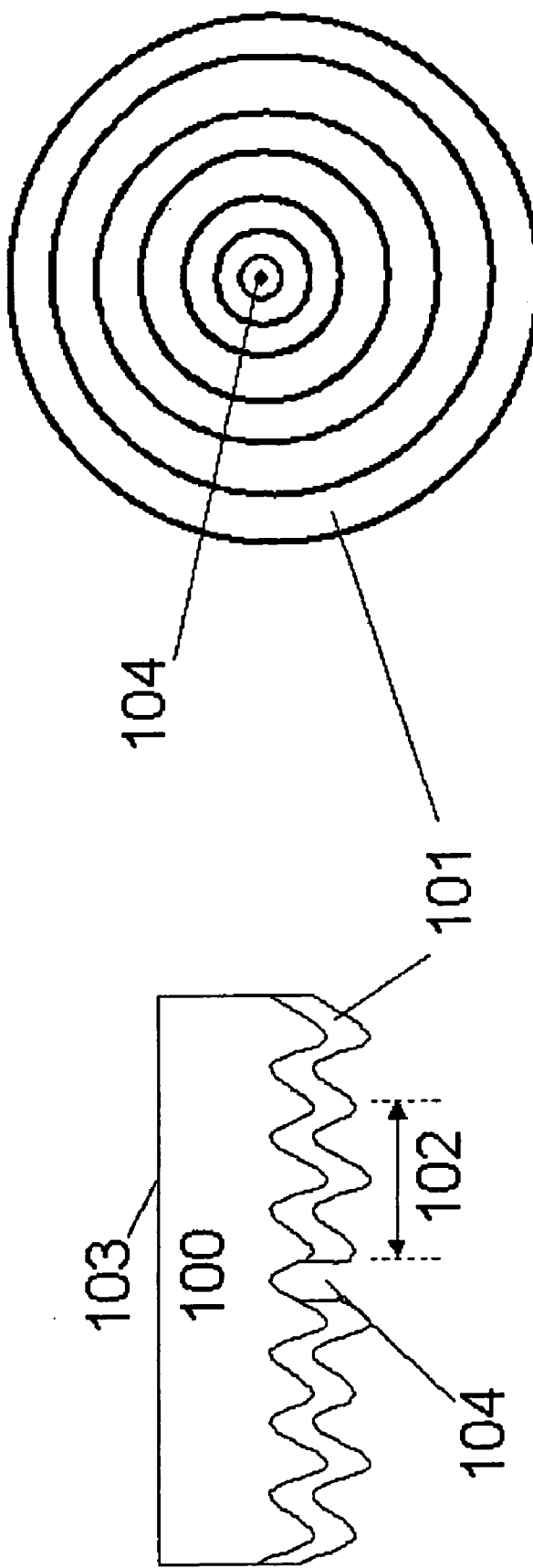

OPTICAL DATA STORAGE AND RETRIEVAL SYSTEMS UTILIZING DUAL ENERGY SOURCES

CROSS-REFERENCE TO RELATED APPLICATIONS

The present invention relates, and is entitled to the benefit of the earlier filing date and priority of U.S. Provisional Patent Application No. 60/316,566 having a filing date of Sep. 1, 2001, the disclosure of which is hereby incorporated by reference and is a divisional of U.S. patent application Ser. No. 10/232,355, filed on Aug. 30, 2002 now U.S. Pat. No. 7,113,474, the disclosure of which is hereby incorporated by reference.

FIELD OF THE INVENTION

The present invention pertains to optical recording materials and optical data storage and retrieval systems. More specifically, the instant invention provides an optical recording medium comprising a phase change material that may be efficiently recorded and erased using a short wavelength laser. Most specifically, the instant invention includes a provision within an optical stack for supplying supplemental energy to a phase change material to enable recording and erasing via a low power energy source. Also, the instant application relates to increases in the optical data storage capacity using blue lasers or plasmon coupling of light through a plasmon lens.

BACKGROUND OF THE INVENTION

The continuing expansion of the range of applications for computers, information technology, and entertainment has created a growing need for faster and more efficient storage and retrieval systems for processing information and data. Of paramount importance to these systems are recording media that are capable of storing as much information as possible while still permitting the quick recording, reading, and erasing of information. Optical recording media offer the most promise for future information storage needs. They currently allow for reading, writing, and erasing of information through all-optical means.

In order for an optical recording medium to be successful, it must be possible to read, write, and erase information quickly and with high fidelity over an extended number of storage and retrieval cycles. This performance capability requires an optical recording medium that can reproducibly and reversibly undergo a physical or chemical transformation in the presence of light. Phase change materials are currently emerging as the leading rewritable optical recording medium. They function by reversibly transforming between two physical states under the influence of a modulated light beam. In the most common phase change materials, the transformation occurs between an amorphous phase and a crystalline or partially crystalline phase. Under typical operating conditions, the amorphous phase corresponds to the recorded state and the crystalline or partially crystalline phase corresponds to the erased state. The process of writing or recording typically involves exposing a portion of the phase change material to a laser beam with sufficient energy to heat the portion of material above its melting point. Subsequent removal of the laser leads to rapid quenching and formation of an amorphous state characterized by structural randomness and disorder. The amorphous state is structurally distinct from the surrounding portions of the phase change material and provides a region of contrast that can be distinguished by a property such as reflectivity. The amorphous regions created by the write beam are frequently referred to as amorphous marks and may be viewed as corresponding to regions of stored information on the recording medium. By applying the write beam to selected portions of the recording medium, a pattern of amorphous marks among crystalline or partially crystalline spaces may be formed that corresponds to the particular information that one wishes to store. Properties such as the length, width, and spacing between amorphous marks may be used to encode information.

The process of reading requires identification of the pattern of amorphous marks and crystalline spaces present on the phase change material. This process entails detecting the contrast between the amorphous marks and the surrounding portions of the phase change material. Detection involves recognizing a difference in at least one property of the amorphous marks relative to the surrounding portions of the material. Differences in state are detected by differences in properties such as electrical resistivity, optical reflectivity or optical transmissivity. Detection of optical properties by an optical read beam is preferred because it permits construction of all-optical storage and retrieval systems. When a laser is used as the read beam, its power is set sufficiently low to avoid changing the physical state of the phase change material. The read beam power, for example, must be low enough to prevent melting and inadvertent formation of unintended amorphous marks or the formation of crystalline regions within amorphous marks.

The process of erasing requires removal of amorphous marks and typically involves transforming the recorded amorphous phase of the phase change material into a crystalline or partially crystalline phase. The transformation can be accomplished optically, for example, by an erase beam provided by a laser that has enough power to heat the amorphous phase above its crystallization temperature, but below its melting temperature. Heating of the amorphous marks with an erase beam to a temperature between the crystallization and melting temperatures provides enough energy to promote the atomic motion necessary for structural reorganization to a crystalline or partially crystalline phase without creating a high mobility or melt state that is susceptible to reforming an amorphous phase upon removal of the erase beam. The crystalline or partially crystalline erased regions may be understood as corresponding to unrecorded regions of the phase change material and are distinguishable from amorphous marks by at least one physical property such as electrical resistivity, optical reflectivity, or optical transmissivity. In an all-optical system, use of a read beam to spatially probe a property such as optical reflectivity or optical transmissivity permits the recognition and distinguishing of the recorded and unrecorded portions of the phase change material. Erasure is not the only process for removing an existing pattern of amorphous marks. Alternatively, an existing pattern can simply be directly overwritten by a new pattern representing new information.

Several chalcogenide-based materials have been demonstrated to function effectively as phase change materials. These materials are capable of existing in the amorphous, crystalline and partially crystalline states at room temperature and are readily transformable between the amorphous phase and the crystalline or partially crystalline phase. Representative phase change materials include alloys containing one or more of the elements Ge, Te, Sb, Se, S, Bi, In, Ga, Ag, Si, and As.

CD technology was the first widely used optical recording technology and is currently being replaced with newer high data density DVD technology. Although the currently available optical phase change materials provide excellent read, write and erase characteristics, further improvements are possible and desirable for future information storage needs. One area of possible improvement is information storage density. The currently available optical phase change materials may provide much higher information storage densities than many conventional magnetic memory media, but are currently limited. The storage density, for example, may be limited by the wavelength of light used to record or write information to a phase change material. The longer the wavelength of light, the larger the size of the recorded amorphous mark and the lower the information storage density. The wavelength of light used in current phase change materials is controlled largely by the availability of semiconductor diode lasers with sufficient power to effect the necessary structural transformations between the recorded and unrecorded states. The most suitable lasers currently available operate in the red-near infrared portion of the visible spectrum. The writing of CDs, for example, may be done with lasers that operate at about 780 nm or 830 nm. This wavelength of light provides recorded marks on a length scale of about 1 micron. More recent DVDs, in contrast, use 650 nm light and contain recorded marks on a length scale of about 0.5 micron. By decreasing the wavelength of light, it becomes possible to further decrease the size of recorded amorphous marks and increase the information storage density.

Achieving shorter write beam wavelengths requires the development of both economical compact short wavelength lasers and new phase change materials capable of functioning at shorter wavelengths. Recent developments in the field of semiconductor lasers indicate that compact lasers based on GaN that operate in the blue region of the visible spectrum may be useful in reading data from high density optical media. Unfortunately, high power blue lasers are not currently economically feasible for use in mass produced products. Additionally, present day phase change materials have lower contrast than is preferred to adequately differentiate between the initialized and written or written and erased states at such shorter wavelengths. Consequently, it is desirable to develop new phase change materials and optical storage and retrieval systems that can fully realize the much higher information storage densities potentially available from blue laser sources.

Another method of increasing the density is to decrease the spot size of present light sources. In any recording technology, the physical dimension of the minimal mark size ultimately governs the storage density. Thus in current generation DVD products, the minimal mark of about 400 nm diameter can achieve about 4.7 GB per side of a 12 cm diameter disk, representing about 2.7 Gbits/in for binary recording. In multi-level (ML) recording, a range of mark sizes are produced between 400 nm diameter and a minimum mark of about 150 nm. This results in an increase of about 2× in the storage capacity over binary recording. The capacity is not greater than this in ML recording because each mark must still be resolved by the optics, meaning that marks of any size must be spaced sufficiently apart. In practice, they are spaced on a constant "data cell" dimension of about 400 nm, i.e., equal to the minimal mark size in binary recording.

In the DVD products and the ML enhancement, the resolution is governed by diffraction limited optics using 650 nm wavelength light, and an objective lens having 0.6 numerical aperture (NA). Strictly speaking, with these optical parameters, the Gaussian input beam can be focused to a full width at half maximum of about 540 nm ($=\lambda/2NA$). Controlling the power and temporal character of the applied Gaussian beam profile can result in significantly smaller marks than what can be resolved by the optics. But the spacing of the ML marks and the minimal mark size in binary recording must both substantially conform to the resolution limit of the optics. Clearly the 400 nm dimension is pushing this limit.

Recent activity to push the optical storage density even higher is based on at least three different strategies: (1) pushing standard "far-field" optics; (2) developing "standard near-field" optics; and (3) developing aperture optics, which is also a near-field concept. To push standard "far-field" optics, the light's wavelength and the lens's NA are critical components to greater resolution. Reducing the wavelength to about 400 nm, and increasing the NA to 0.85, results in a 2.3× improvement in resolution for a storage capacity of about 25 GB per side of 12 cm diameter disk (~14 Gbits/in$^2$). In developing "standard near-field" optics the NA's are pushed beyond 1.0 using a solid immersion lens (sil) to approach a capacity of about 35 GB using the blue laser light. Here, evanescent coupling between the sil and the active phase change layer requires very short distances between the lens and the media of less than 100 nm. In one novel approach, the near field optic is incorporated into the disk itself, thereby eliminating the need for such fine control of the optics.

Finally in developing aperture optics, the mark dimension is not governed by optical principles of lenses, but by apertures. Here, in "Super-RENS" technology, the disk contains one low melting temperature layer such as Sb that acts as a controllable aperture. By use of the Gaussian profile laser beam, small apertures can be obtained with resolution limits of less than 100 nm using 635 nm wavelength light. (See J. Tominaga et al., Appl. Phys. Lett. 73, 2078 (1998)). Tominaga et al., have recently proposed to achieve greater read back signal strength by further enhancing the optical coupling using surface plasmons. In their work, geometric constraints do not allow surface plasmons (SP) on the metallic Sb layer because momentum is not conserved. Instead, they propose to use marks recorded in the GeSbTe phase change layer itself to act as a grating in which to generate the SP's. The SP's then localize preferentially around smaller marks, thereby amplifying their effective coupling cross section. It is not clear how effective using the marks themselves will actually be to generate the grating. This requires a change in sign of the real part of the dielectric function between the two relevant components (i.e., between crystalline and amorphous states of the GeSbTe compound). The optical constants used in their analysis correspond to the hexagonal and amorphous states. They did not use the crystalline state of the GeSbTe material that is relevant in the phase change applications, namely the fcc state. The real part of the dielectric function is positive for both the fcc and amorphous states, making generation of SP's unlikely.

A separate developmental front has proceeded with surface plasmons themselves that ultimately may play a role in optical memory applications. Recently Ebbesen et al. showed that normally incident light can transmit (up to 10% level) through a flat optically thick metal film that is perforated with many small holes, even though their diameters are roughly a factor of 10 less than the light's wavelength (see T. W. Ebbesen et al., "Extraordinary optical transmission through sub-wavelength hole arrays", Nature 391, 667 (1998) and H. F. Ghaemi et al, "Surface plasmons enhance optical transmission through subwavelength holes", Phys. Rev. B 58, 6779 (1998)). These diameters are significantly smaller than the cut-off dimension that would allow propagation. Usually, light incident normally to a metal surface cannot couple with surface plasmons, which are longitudinal waves along the surface where the electric field and propagation vectors are parallel, because light propagates as transverse waves whose electric and propagation vectors are perpendicular. Another way to say this is that coupling does not occur because energy and momentum are not simultaneously conserved. By scattering off the holes in a grating however, the light's momentum can gain some component parallel to the metal surface through the grating "momentum".

Once it became clear the importance of the grating momentum in coupling with SP's, it was realized that the scattering sites do not need to be holes through the metal film. In fact, any periodic (i.e. diffraction-like) grating can stimulate surface plasmons. Indeed, the NEC group has shown how a 2-D array of pits can be used to enhance the transmission of light through a single hole. See D. E. Grupp et al., "Beyond the Bethe Limit: Tunable Enhanced Light Transmission Through a Single Subwavelength Aperture", Adv. Mater. 11, 860 (1999); Thio et al., "Strongly Enhanced Optical Transmission Through Subwavelength Holes in Metal Films", Physica B, 279, 90 (2000); and Thio et al., "Enhanced Light Transmission through a Single Sub-Wavelength Aperture", Optics Lett. 26, 1972 (2001). They also indicate that a circular concentric pattern is optimal for transmission through a single hole.

Clearly proper application of this surface plasmon could be effective to increase the optical data storage density on phase change optical recording media. What is needed is an effective plasmon lens that can channel sufficient quantities optical energy through a sub-wavelength apertures to produce sub-wavelength spots on optical recording media.

SUMMARY OF THE INVENTION

The instant invention provides an improved optical recording medium and optical data storage system with increased recording and/or erasing efficiencies when using short wavelength or low power excitation sources.

The optical recording medium of the instant invention is generally a multilayer optical stack that includes a phase change material having a crystalline and amorphous state. In one embodiment, the phase change material shows improved absorption contrast between the crystalline and amorphous states at short wavelengths such as in the blue portion of the visible spectrum. In another embodiment, the optical recording medium includes a crystallizing layer in communication with a phase change material for the purposes of facilitating the crystallization of the phase change material. In another embodiment, the optical recording medium includes means for receiving energy from external fields to provide field enhanced recording.

The instant invention further provides a method and apparatus for recording and retrieving information from an optical recording medium. The method and apparatus provide for a change of structural state of a phase change material through the use of a lesser amount of applied laser energy or the conjoint use of different kinds of applied energy. Embodiments in which a change in structural state is provided at an increased rate or effected by short wavelength excitation sources are also provided.

The present invention also includes a light-plasmon coupling lens including an optically transparent substrate having a light incident surface and a light-plasmon coupling surface opposite the light incident surface. The light-plasmon coupling surface including at least a set of circular concentric peaks/valleys which form a Fourier sinusoidal pattern in the radial direction of the circular concentric peaks/valleys. A conformal layer of metal is deposited on the light-plasmon coupling surface of the substrate and has an aperture at the center of thereof through which plasmons are transmitted.

For a more complete understanding of the present invention, reference is made to the following detailed description and accompanying drawings.

BRIEF DESCIPTION OF THE DRAWINGS

Figure 6A:
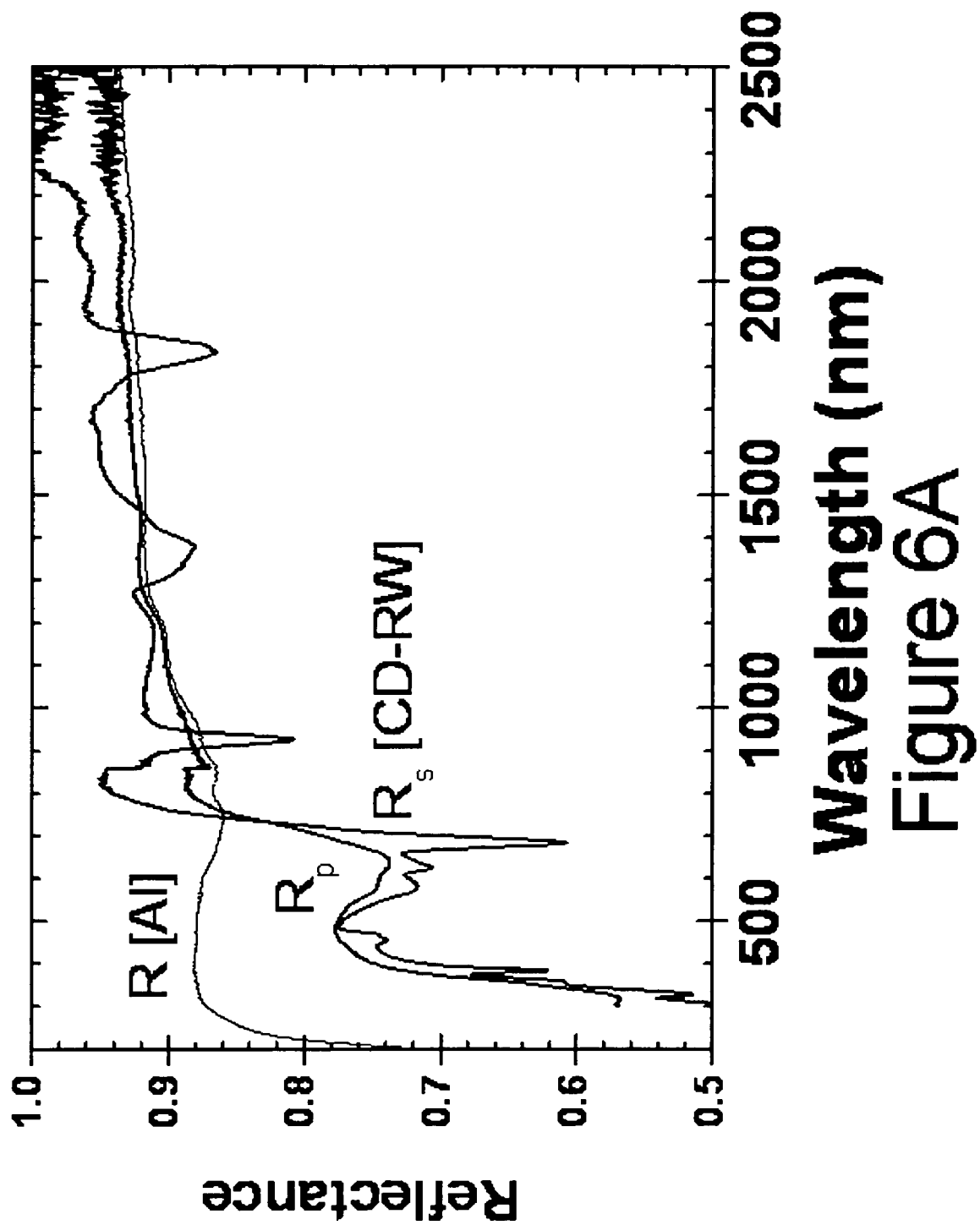
Figure 6B:
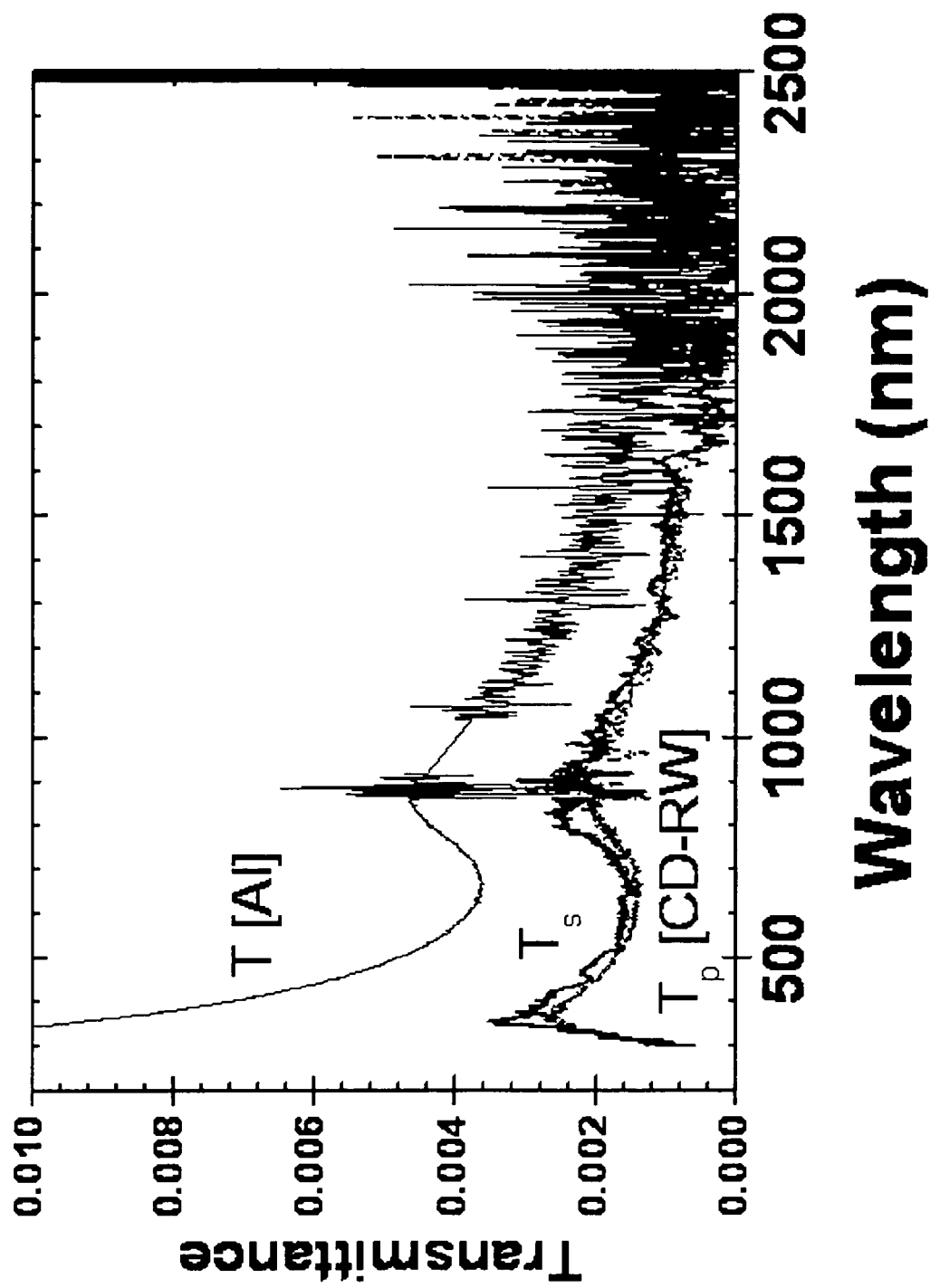
Figure 7A:
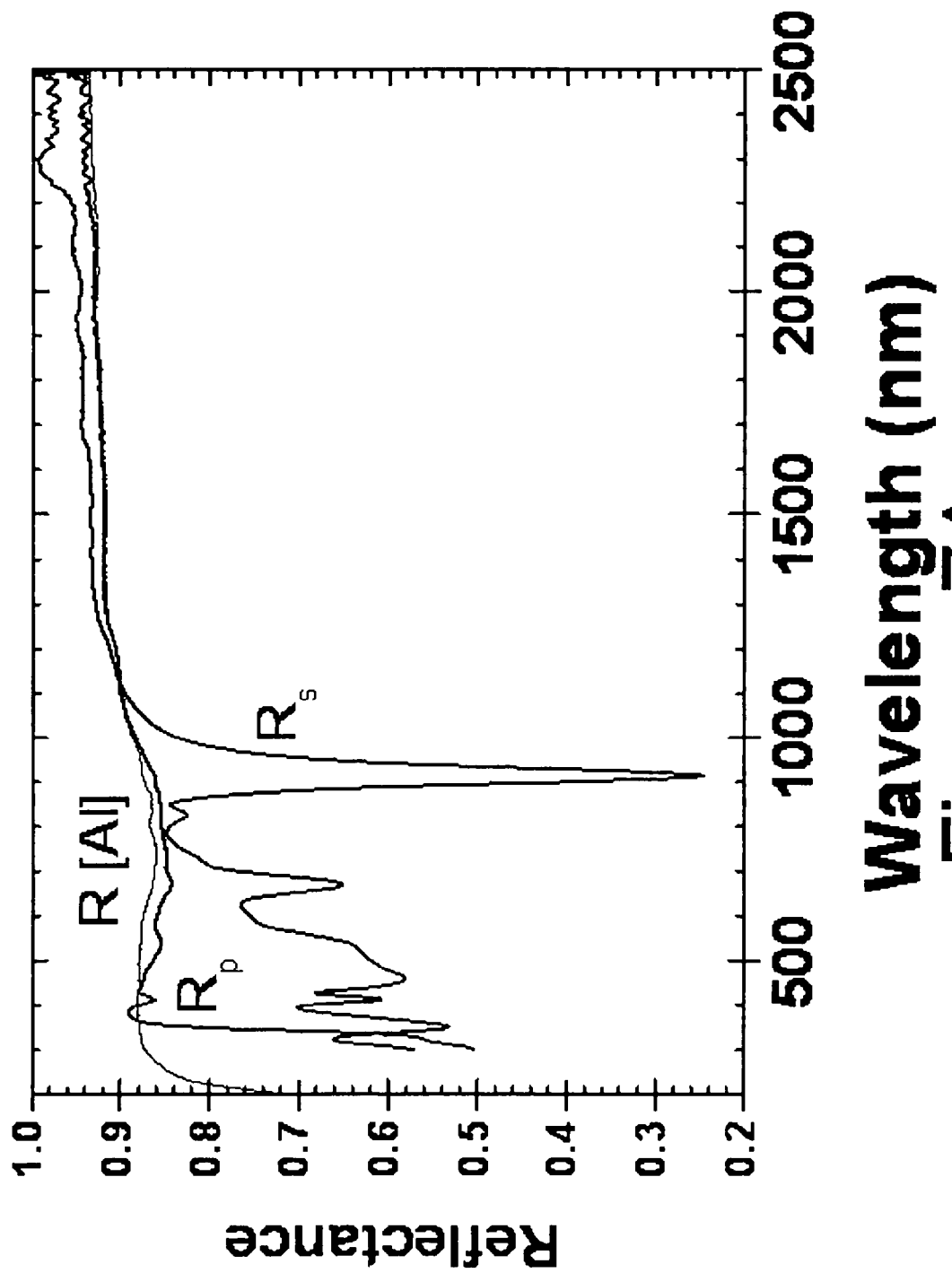

FIGS. 5A-C depict the different sample types tested by the instant inventors for development of a light-plasmon coupling lens;

FIG. 6A shows the reflectance and FIG. 6B shows the transmittance data in both polarizations for light incident on the Al film (40 nm) side of a CD-RW sample which does not form a light-plasmon coupling lens of the instant invention;

FIG. 7A shows the reflectance and FIG. 7B shows the transmittance data in both polarizations for light incident on a light-plasmon lens of the instant invention; and FIGS. 8A (side view) and 8B (bottom view) depict a schematic representation of a light-plasmon coupling lens of the instant invention.

DETAILED DESCRIPTION OF PREFERRED EMBODIEMENTS

Blue Lasers

The present invention provides an optical recording medium and an optical storage and retrieval system suitable for use with blue and other short wavelength laser sources. It confronts two important aspects necessary to realize the benefits of using blue lasers to read, write, and erase information on an optical recording medium. First, the invention addresses the need to develop new phase change materials that are more suitable than current materials for integration into an information storage and retrieval system based on a blue laser. Second, the invention addresses the fact that economical compact blue lasers are expected to have lower powers than the red and near-infrared lasers currently used in optical recording systems.

A transition to optical storage and retrieval systems based on blue or other short wavelength lasers requires a reconsideration of the suitability of current phase change materials for use as the optical recording medium. One important consideration is whether blue laser excitation is capable of effecting the structural transformations necessary for writing and erasing information to or from the phase change material. In order to write or record information, it must be possible for the phase change material to absorb enough of the blue laser excitation to heat up to a temperature at or above its melting temperature. Consequently, it is necessary to consider the ability of potential phase change materials to absorb blue light.

Figure 1:
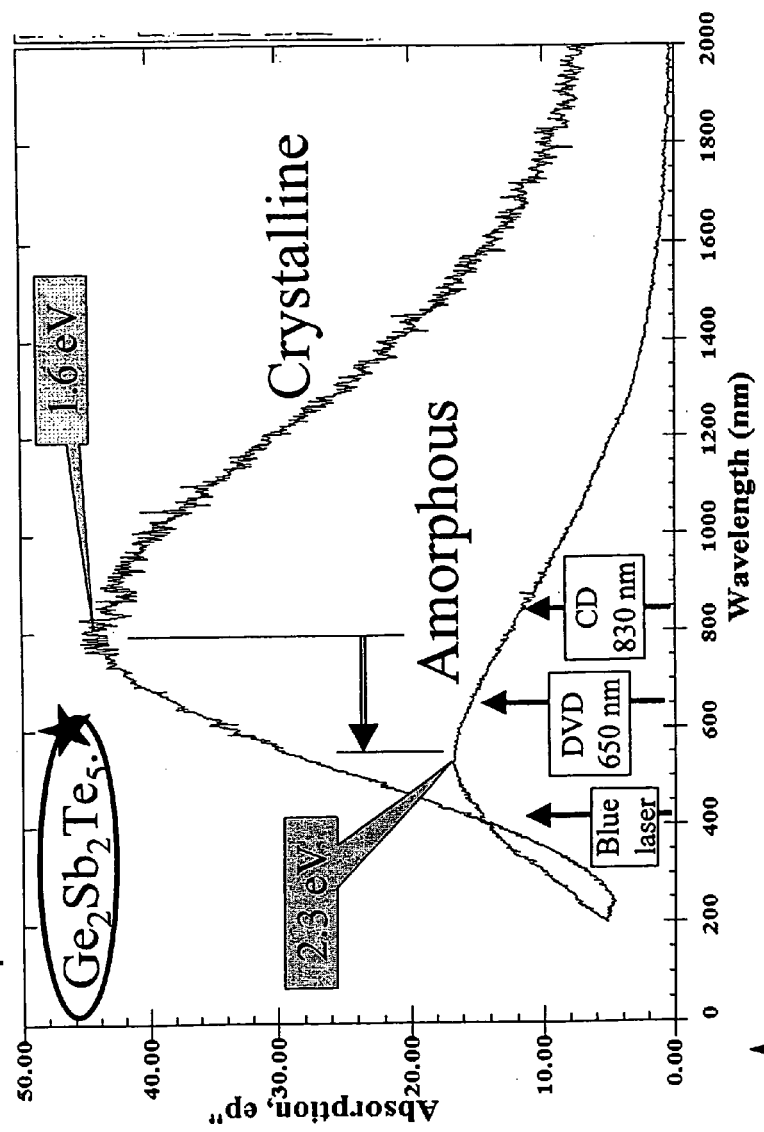
FIG. 1 is a plot of the absorption spectra of the crystalline and amorphous states of $Ge_2Sb_2Te_5$.

FIG. 1 shows the absorption spectra of the crystalline and amorphous forms of a representative phase change material, $Ge_2Sb_2Te_5$, currently being used as an optical recording medium. Other common phase change materials exhibit similar spectra. FIG. 1 also illustrates representative wavelengths of light currently being used in CD and DVD applications as well as a representative blue laser excitation wavelength. FIG. 1 indicates an expected problem associated with attempting to use current phase change materials in optical storage and retrieval systems based on blue lasers. Namely, the absorption strength is observed to decrease dramatically as the excitation wavelength shifts into the blue portion of the spectrum. At the red and near-infrared wavelengths used in current CD and DVD systems, both the crystalline and amorphous states absorb well enough to permit laser-induced structural transformations. The rapid decrease in absorption strength in the short wavelength portion of the spectrum indicates that it may become more difficult to induce the transformations with blue lasers. At the very least, the low absorption strength in the blue indicates that very high power blue lasers will be required in order for the current phase change materials to be suitable as optical recording media in storage and retrieval systems based on blue lasers. Such lasers may not be available or economically feasible.

FIG. 1 also reveals another consideration associated with using current phase change materials in optical storage and retrieval systems based on blue lasers. This second consideration is whether a blue laser is capable of distinguishing the written or recorded amorphous regions of the phase change material from the erased or unrecorded crystalline or partially crystalline regions. That is, even if it is possible to induce transformations between the amorphous and crystalline or partially crystalline phases of a phase change material with a blue laser, it is still necessary to be able to detect a difference in at least one physical property of the different states. This detection corresponds to the read process. Preferably, to simplify system design and minimize costs, the read process should be accomplishable with the blue laser used in the recording of information.

Since optical reflectivity is the most convenient physical properties to use in an optical read process, it is desirable to have an optical stack that exhibits a high contrast in optical reflectivity between the amorphous and crystalline or partially crystalline states of a phase change material at blue wavelengths. FIG. 1 illustrates the situation common to currently available phase change materials. In addition to a decrease in optical absorption at short wavelengths, the contrast or difference in absorption between the amorphous and crystalline states of $Ge_2Sb_2Te_5$ decreases as well. A decrease in the contrast in reflectivity between the amorphous and crystalline states may also occur. The decreased contrast at blue wavelengths means that it becomes difficult to discriminate between the written amorphous and erased crystalline or partially crystalline regions in the phase change material with a blue laser.

Figure 2:
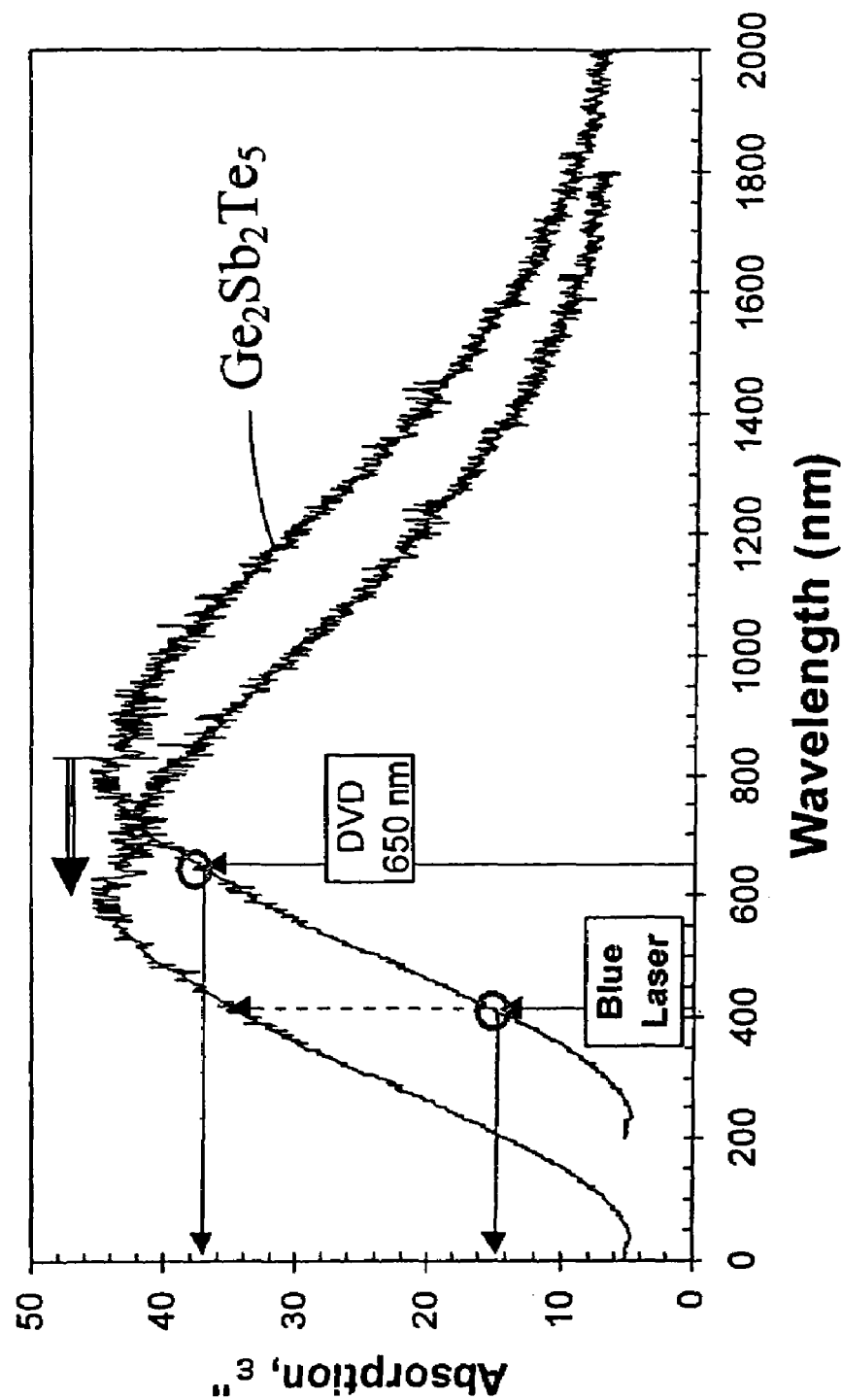
FIG. 2 is a representative plot of the absorption spectrum of a phase change material for use with a blue laser in accordance with the present invention.

One conclusion revealed by FIG. 1 is that phase change materials that function well at the red and near-infrared wavelengths currently used in CD and DVD applications are not expected to be suitable for blue wavelengths. Instead, new phase change materials are needed to realize the information storage density benefits available from blue lasers. Acceptable new materials optimally should possess strong absorbance and high contrast in the blue portion of the spectrum. FIG. 2 contained herein shows an example of an absorption band for a crystalline or partially crystalline phase that would be suitable for use with blue lasers. A comparison with the absorption band of crystalline $Ge_2Sb_2Te_5$ is also provided. FIG. 2 indicates that a shift of the absorption band of the phase change material to higher energy (shorter wavelengths) will lead to better compatibility with blue lasers.

The instant inventors have considered factors that can be used to control the energy of absorption of phase change materials. Phase change materials based on Te have chain-like structures of Te atoms. Elements such as Ge and Sb are crosslinking agents that act to disrupt the chains and to form bridges between chains. The absorption energy is controlled by interactions along the Te chains. The present inventors have reasoned that chemical bond strength along the chains is a determining consideration in establishing the absorption energy of a phase change optical material. Specifically, stronger chemical bonding along the chain leads to higher energy absorption bands. Consequently, the present inventors have considered ways to increase the bonding strength along the chains of phase change optical materials.

One aspect of the instant invention is to modify the composition of Te based phase change materials in such a way as to increase the bond strength along the chains while maintaining the ability to readily transform between the amorphous and crystalline or partially crystalline states. If the bond strength along the chains is increased too much, the structure becomes too robust and it becomes difficult to transform from one state to another. If the bond strength is not increased enough, however, the absorption properties desired for blue lasers won't be achieved. Consequently, the effects of structural robustness and absorption energy must be balanced.

Based on bond strength considerations, the instant inventors have identified Se as a modifying element that may substitute in whole or in part for Te in the application of phase change materials to optical storage and retrieval systems based on blue or short wavelength lasers. Since Se is isomorphous with Te, phase change materials that incorporate Se as a modifying element are expected to adopt similar chain structures and to exhibit similar transformations between states as Te-based phase change materials. Like Te, Se also has lone pair orbitals. Lone pair orbitals exert important influences on structural stability and are responsible for repulsive interactions that facilitate the rearrangement of atoms during structural transformations. This similarity between Te and Se further indicates that Se-modified phase change materials will readily undergo transformations between amorphous and crystalline or partially crystalline states. Also, since bonding between Se atoms is stronger than bonding between Te atoms, incorporation of Se into phase change materials may shift the absorption band to shorter wavelengths and render the materials more suitable for blue lasers. Furthermore, the similarity in the nature of the structural transformations for Se-based and Te-based phase change materials indicates that the absorption bands of both the amorphous and crystalline or partially crystalline phases will shift to a similar extent to higher energy. Consequently, the favorable contrast currently enjoyed by Te-based phase change materials in optical storage and retrieval systems based on red and near-infrared lasers may extend to Se-modified phase change materials in systems based on blue or short wavelength lasers.

The phase change material preferably includes at least one modifier such as Se in an amount sufficient to substantially increase the contrast or contrast ratio in absorption or reflectivity between amorphous and crystalline or partially crystalline states at one or more blue wavelengths shorter than 430 nm, such as 400-410 nm, relative to the unmodified composition. The modifier is preferably provided in an amount sufficient to increase the reflectivity of a recording medium or optical stack when the phase change media is in the amorphous state to about 3 to 10% and more preferably to about 5%. The modifier is preferably provided in an amount sufficient to increase the reflectivity of the recording media when the phase change material is in the crystalline state to about 15 to 30% and more preferably to about 20%. The modifier is preferably provided in the phase change medium in an amount sufficient to provide a contrast or dynamic range (i.e. the reflectivity difference of the medium between crystalline and amorphous states) of 5% to 27% and more preferably about 15%. In another embodiment, the modifier provides an increase in absorption of one or both of the amorphous and crystalline or partially crystalline states of at least 10% at a wavelength shorter than 430 nm relative to an unmodified composition. More preferably the increase in absorption coefficient is greater than about 50%, and most preferably the increase in absorption coefficient is greater than 100% relative to an unmodified composition. In another embodiment, the contrast in absorption coefficient between the amorphous and crystalline or partially crystalline states of a phase change material is at least 10% at a wavelength shorter than 430 nm relative to an unmodified composition. Most preferably the contrast in absorption coefficient is at least 50% and most preferably, the contrast in absorption coefficient is at least 100% relative to an unmodified composition.

In a preferred embodiment of the instant invention, the phase change recording materials is a Te-based phase change material wherein substitution of Se in whole or in part for Te provides materials more suitable for use in optical data storage and retrieval systems based on blue lasers. A modified form of an original form of a Te-based phase change material in which Se is substituted in whole or in part for Te may be viewed as a solid solution of a Te-based phase change material with Se. The phase change alloy is preferably a eutectic alloy and most preferably a stoichiometric compound or solid solution. Te-based phase change materials for which the Se substitution of the instant invention applies include alloys of Te with one or more of Ge, Sb, Sn, Si, In, Ga, S, As, Ag and Bi.

The phase change materials of the instant invention have a crystalline state and an amorphous state and may be reversibly transformed between these states through the providing of energy. Many properties and compositions of phase change materials are known in the art and have been discussed previously, for example, in U.S. Pat. Nos. 3,271,591; 3,530,441; 4,653,024; 4,710,899; 4,737,934; 4,820,394; 5,128,099; 5,166,758; 5,296,716; 5,534,711; 5,536,947; 5,596,522; 5,825,046; 5,687,112; 5,912,104; 5,912,839; 5,935,672; 6,011,757; and 6,141,241 to the instant assignee, as well as U.S. patent application Ser. Nos. 10/026395 and 60/316566 to the instant assignee, the disclosures of which are hereby incorporated by reference.

According to the instant invention, modification of a phase change material through the substitution of Se in whole or in part for Te in Te-based phase change alloys, without modification of the amount or type of other elements in the alloy composition, leads to increased absorption and increased contrast at blue and short wavelengths. For example the generally known $Ge_2Sb_2Te_5$ alloy may be modified in accordance with the present invention. According to a preferred embodiment hereof, substitution of some or all of the Te with Se to form a solid solution, without altering the relative proportions of Ge and Sb, leads to improved absorption and contrast at blue wavelengths. Thus, the Se containing solid solution $Ge_2Sb_2Te_{5-x}Se_x$, where x is greater than zero and less than or equal to 5, has greater absorbance and contrast at blue wavelengths than the original (i.e. unmodified) form $Ge_2Sb_2Te_5$. Se is provided in an amount sufficient to provide a phase change recording medium suitable for use with a blue laser.

In addition to developing more suitable phase change materials as optical recording media at blue wavelengths, the instant invention further addresses complications associated with the low powers expected from early generation compact blue laser sources. The red and near-infrared lasers used in current CD and DVD systems are a mature technology and have been optimized to provide high powers in compact, economical packages. Currently, high powers at blue and other short wavelengths are only available from expensive, bulky gas phase, dye or non-semiconducting solid state lasers. Compact blue and short wavelength laser technology is a promising, but still emerging technology.

The difficulty with low power in blue lasers for optical recording applications is that it greatly limits the range of potential optical recording media. In order to be satisfactory, a blue laser must provide enough power to induce structural transformations in phase change materials. The greatest energy requirement is associated with the writing process where it is necessary to impart enough energy to form an amorphous phase (e.g. heat a phase change material to at least its melting temperature). The low power available from early generation blue lasers will provide insufficient energy to induce formation of an amorphous phase in virtually all known phase change materials. Lasers having insufficient power or energy to induce formation of an amorphous phase may hereinafter be referred to as sub-threshold lasers. The general difficulty described hereinabove of achieving high absorption at blue wavelengths exacerbates the difficulties associated with low power blue laser powers.

Despite the complications associated with sub-threshold laser power, it is still desirable to reap the high storage density benefits potentially available from blue lasers. The instant inventors have recognized that the advantages offered by blue lasers are achievable if the energy available from the blue laser is supplemented in some way, such as by an additional source of energy so that there are a plurality of energy sources including a blue laser, or by substituting some or all of the write power with a red or other long wavelength laser, or by adding a catalyzing layer to the optical media to either reduce the necessary power requirements for writing and erasing or to ease the change from crystalline to amorphous and vice versa or to ease the ability of the phase change recording media to crystallize.

According to the additional energy source strategy, a sub-threshold blue laser, in combination with one or more secondary optical, electrical, magnetic, thermal or chemical energy sources, is used to provide the energy necessary to induce transformations between the amorphous and crystalline or partially crystalline states of phase change materials. Consequently, it becomes possible to achieve the benefits of blue lasers even if they have sub-threshold power.

Figure 3:
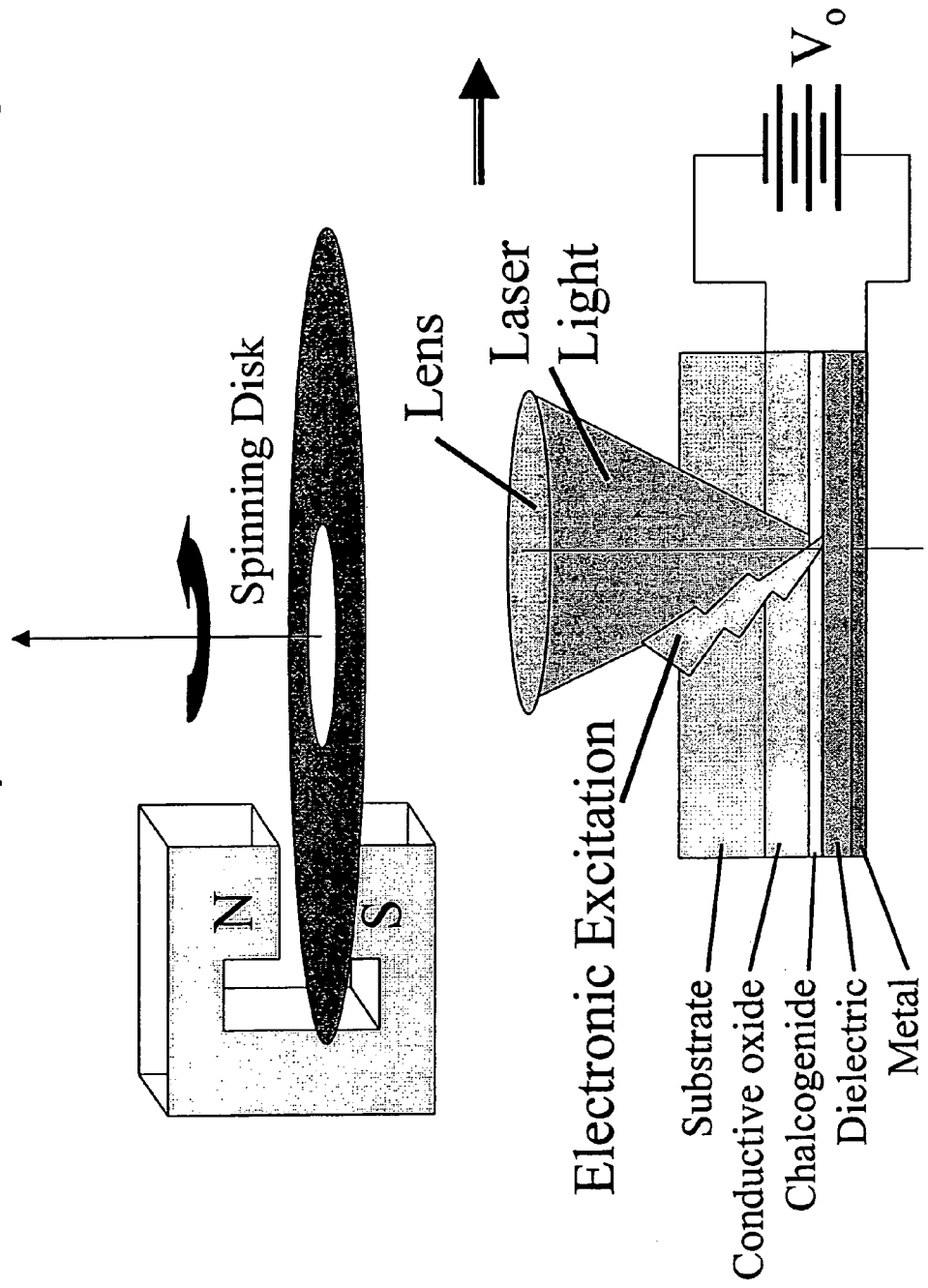
FIG. 3 is an illustration of a preferred optical data storage system in accordance with the present invention.

One approach to supplementing the energy of a sub-threshold blue laser is to add energy in the form of electrical energy to the phase change material. FIG. 3 herein presents one method for combining energy from a laser with electrical energy. FIG. 3 illustrates the concept of on-board electrical power generation. During a read, write or erase operation, the optical recording medium (labeled as "spinning disk" in FIG. 3), is spinning. The present inventors have recognized that the need to spin the optical recording medium lends itself to the production of electrical energy within the medium. Electrical energy may be generated by incorporating wires into the optical recording medium and rotating the medium in a non-uniform magnetic field. This procedure induces an electrical current and electrical field in a direction normal to the phase change layer as depicted by the voltage $V_0$ in FIG. 3. As a result, electrical energy is added to the phase change layer (referred to as "chalcogenide" in FIG. 3). This electrical energy may be combined with the energy from a laser to effect transformations between different structural states of the phase change material.

The conductive oxide and metal layers shown in FIG. 3 are examples of how wires may be incorporated into an optical recording medium containing a phase change layer. Conductive layers may be introduced during the growth of the optical recording medium or may be patterned on a finished optical recording medium. The north and south poles of a magnet used to produce a magnetic field are depicted in FIG. 3. The non-uniform magnetic field may be applied over selected regions of the recording medium as shown in FIG. 3 or applied across the entirety of the medium. Other methods for introducing and configuring wires and magnetic fields are, of course, possible and fall within the scope of the present invention. Also within the scope of the present invention is the manipulation or control of electrical current produced in the rotating optical medium by the non-uniform magnetic field. Once generated, the electrical current may be subsequently processed by electrical circuitry integrated on-board the optical recording medium. Circuitry may be incorporated as additional layers within the optical recording medium or may be patterned on the exterior of the optical recording medium. The current initially produced by a non-uniform magnetic field is an ac current. Rectifying circuitry may be used to convert the ac current to a dc current. Logic circuitry further offers an opportunity to target or direct the current to specific locations of the phase change layer. This configuration permits addressing of localized regions or memory cells within the phase change layer.

A second approach of the present inventors to supplementing the energy of a sub-threshold laser is to store energy in a layer of the optical recording medium other than the phase change layer. The concept behind the energy storage layer is to include a layer in the optical recording medium that stores energy that may be controllably released and communicated to the phase change layer to aid the transformation between the erased and written states. Energy stored in the energy storage layer is a form of potential energy that may be used to supplement the energy provided by a laser. The energy communicated by the energy storage layer to the phase change layer may be in the form of electrical, chemical or mechanical energy. The basic requirement of an energy storage layer is that it be capable of transforming from a high energy state to a low energy state. Preferably, the transformation occurs coincidentally with the initiation of a transformation of state of the phase change material. Most preferably, the transformation of the energy storage layer is reversible.

According to a preferred mode, the transformation of the energy storage layer between its high and low energy states occurs simultaneously with the transformation of the phase change material between its unrecorded and recorded states. In a typical phase change material, more energy is needed to effect the writing process (the transformation from the crystalline or partially crystalline phase to the amorphous phase) than the erasing process (the transformation from the amorphous phase to the crystalline or partially crystalline phase). Consequently, when a typical phase change material is subjected to a sub-threshold power write beam, energy must be transferred from the energy storage layer to the phase change material to aid the write beam in order to effect the writing or recording process. This transferal of energy coincides with a transformation of the energy storage layer from its high energy state to its low energy state. Upon transferal of energy, the phase change material is in its recorded amorphous state and the energy storage layer is in its low energy state.

In a more preferred mode, it is possible to restore the energy storage layer to its high energy state so that many cycles of writing in the presence of a sub-threshold write beam may be accomplished. In principle, the energy needed to restore the energy storage layer may be provided by an external energy source. In practical applications, it is desirable to restore the energy storage layer during the normal operation of the optical recording medium. In the instant invention, it is envisioned that restoration of the energy storage layer occurs during the erase or overwrite process. Since the energy required for the crystallization process may be less than that required for the amorphization process, energy in the crystallization beam in excess of the energy needed to effect crystallization may be used to transform the energy storage layer from its low energy state to its high energy state. A laser beam that is sub-threshold with respect to amorphization is not necessarily sub-threshold with respect to crystallization. If the power provided by a sub-threshold amorphization beam is over the crystallization threshold, the excess energy may be used to restore the energy storage layer to its high energy state. Once restored, the energy storage layer is available to aid further write cycles. If the power provided by a sub-threshold amorphization beam is below the crystallization threshold, then an additional source of energy is needed to both effect crystallization and restore the energy storage layer.

In one embodiment, the energy storage layer is comprised of a material capable of undergoing an exothermic chemical reaction in the presence of the amorphization beam. In this portion of the description of this embodiment of the instant invention, one laser is used for amorphization and crystallization and the laser power is sub-threshold with respect to the amorphization process and above threshold with respect to the crystallization process. Prior to amorphization, some of the phase change material is in its crystalline or partially crystalline state and the energy storage layer is in a high energy state that contains reactant molecules capable of undergoing an exothermic chemical reaction in the presence of the amorphization beam. Upon initiation of the amorphization process, some of the energy from the amorphization beam may be used to initiate a chemical reaction in the portion of the energy storage layer exposed to the beam. Since the reaction is exothermic, energy is released from the exposed portion of the energy storage layer and transferred to the phase change layer to aid its transformation from its crystalline or partially crystalline state to its amorphous state. The energy provided by the exothermic chemical reaction, in combination with energy provided by a sub-threshold amorphization beam, is sufficient to effect the amorphization transformation of the phase change material.

Upon conclusion of the recording process, the phase change material is in its written or amorphous state and a portion of the energy storage layer is in its low energy state. Restoration of the portion of the energy storage layer to its high energy state requires a reversal of the chemical reaction. Since the reaction that occurred during the recording process was exothermic, reversal of the reaction is endothermic and therefore requires an input of energy. In this embodiment, the energy required to reverse the chemical reaction and restore the energy storage layer to its high energy state is provided by the laser during the erase or overwrite process. Since the energy of the laser beam of this embodiment is above the crystallization threshold, it contains excess energy that may be used to restore the reacted portion of the energy storage layer to its high energy unreacted state. Upon conclusion of the erase or overwrite process, the phase change material is in its crystalline or partially crystalline unrecorded or overwritten state and the energy storage layer is in its high energy state.

The above embodiment is also readily accomplished by an energy storage layer comprised of a material capable of undergoing an exothermic phase change or structural transformation during the write process. Although not described in detail, this alternative to the above embodiment is readily understood from the preceding discussion. Similarly, this embodiment is readily accomplished with multiple laser sources or combinations of laser sources with non-laser sources of energy such as thermal, mechanical or electrical sources.

In another embodiment, the energy storage layer provides energy in the form of electrical energy to the phase change layer. In this embodiment, the energy storage layer is comprised of a capacitive material capable of storing and releasing electrical charge. In this embodiment, one laser is used for amorphization and crystallization and the laser power is sub-threshold with respect to the recording process and above threshold with respect to the erase or overwrite process. Prior to recording, some of the phase change material is in its crystalline or partially crystalline state and the energy storage layer is in a high energy state that contains a high amount of electrical charge. Upon initiation of the recording process, some of the energy from the write beam is used to initiate a release of charge from the portion of the energy storage layer exposed to the beam. This charge release is tantamount to a capacitive discharge and has the effect of transferring electrical energy to the phase change material to aid its transformation from its unrecorded crystalline or partially crystalline state to its recorded or amorphous state. The electrical energy provided by the capacitive discharge, in combination with energy provided by a sub-threshold recording beam, may be set to be sufficient to effect the amorphization transformation of the phase change material.

Upon conclusion of the writing process, the phase change material is in its recorded or amorphous state and a portion of the energy storage layer is in a low charge state. Restoration of the portion of the energy storage layer to its high charge state requires a restoration of the charge lost during the capacitive discharge that occurred during the amorphization process. Restoration requires an input of energy. In this embodiment, the energy required to restore the charge of the energy storage layer is provided by the laser during the crystallization process. Since the energy of the laser beam of this embodiment is above the crystallization threshold, it contains excess energy that may be used to restore the capacitively discharged portion of the energy storage layer to its high charge state. Restoration of the charge may occur through photon absorption by the energy storage layer followed by conversion to electrical charge or through an analogous process involving on-board circuitry in electrical communication with the energy storage layer. Upon conclusion of the crystallization process, the phase change material is in its crystalline or partially crystalline unrecorded or overwritten state and the energy storage layer is in its high charge state.

The energy storage layer in the preceding embodiments may be directly adjacent to the phase change layer or further removed. Provided that the energy storage layer is in energetic communication with (i.e. is able to transfer or provide energy to) the phase change layer, either directly or through intermediary layers, it may be located anywhere within a multilayer optical recording medium. Although invented in the context of developing optical storage and retrieval systems based on low power blue or short wavelength lasers, the present inventors recognize the advantages of the energy storage layer more generally as a way to integrate low power lasers or phase change materials that require supplemental energy to be effective.

A related aspect of the present invention concerns the use of an energy storage layer to enhance crystallization kinetics in optical storage and retrieval systems based on phase change materials in which the power of the write laser is above the threshold needed to effect the transformation from the crystalline or partially crystalline state to the amorphous state. Slow crystallization is a phenomenon associated with many actual or potential phase change materials. In contrast to the process of forming an amorphous phase, the process of crystallization is frequently a slow process limited by the kinetic rate of crystallization. Thus even when the thermodynamic energy requirements for crystallization are met, the rate of crystallization may be too slow to be practically useful. In these kinetically limited crystallization processes, it would be desirable to speed up crystallization.

In an embodiment related to the embodiments based on the energy storage layer described hereinabove, the instant inventors have further invented a crystallization layer which is applicable when the power of the laser used in an optical storage and retrieval system is above the threshold needed to effect the transformation of the phase change material from its crystalline or partially crystalline state to its amorphous state. Under these conditions, recording, erasing, overwriting, and reading may be accomplished with a laser and the crystallization associated with the erase or overwriting process limits the speed of the system.

A crystallization layer may be included in an optical recording medium for the purposes of accelerating the crystallization that occurs in the erase or overwrite process. The acceleration occurs as a result of a structural or chemical transformation in the crystallizing layer. The range of transformations associated with the crystallizing layer is analogous to those described hereinabove for the energy storage layer. The crystallization layer functions by transferring energy or momentum to the phase change layer during its transformation from the amorphous recorded state to a crystalline or partially crystalline state during the erase or overwrite process. In the situation where the crystallizing layer transfers energy to the phase change layer, the transferal of energy is analogous to that described hereinabove in the description of the energy storage layer, except that the energy is transferred during the crystallization process rather than during the amorphization process and restoration occurs during the amorphization process rather than the crystallization process. The additional energy provided by the crystallizing layer is believed by the present inventors to accelerate crystallization by enhancing molecular motions.

Independent of energy transferal, the crystallizing layer may enhance the crystallization of the phase change layer by providing momentum or an impetus to initiate crystallization. Slowly crystallizing materials are frequently sluggish because of difficulties in initializing the crystallization process. By providing an impetus for initializing crystallization, the crystallization layer accelerates the crystallization process. While not wishing to be bound by theory, it is speculated by the present inventors that the momentum or impetus provided by the crystallization layer may originate from volume changes that occur during the transformation of the crystallizing layer from one state to another. The volume change may be an expansion or a contraction and induces a counteracting volume change in the phase change layer. This counteracting volume change may provide momentum or impetus that facilitates, accelerates or initiates crystallization.

If crystallization is enhanced through the providing of momentum or impetus to initiate crystallization, the direction of energy transferal is arbitrary and not determinative. The crystallizing layer may or may not transfer energy to or receive energy from the phase change material. The volume change associated with the transformation of the crystallizing layer is speculated by the present inventors to enhance crystallization.

In one embodiment, the crystallizing layer of the present invention is used in combination with the Se based phase change materials described hereinabove. One possible drawback associated with the Se based phase change materials of the present invention is that crystallization of Se based materials is frequently slow. Inclusion of a crystallizing layer in optical recording media comprising Se based phase change materials may accelerate crystallization and lead to faster erase times.

Figure 4:
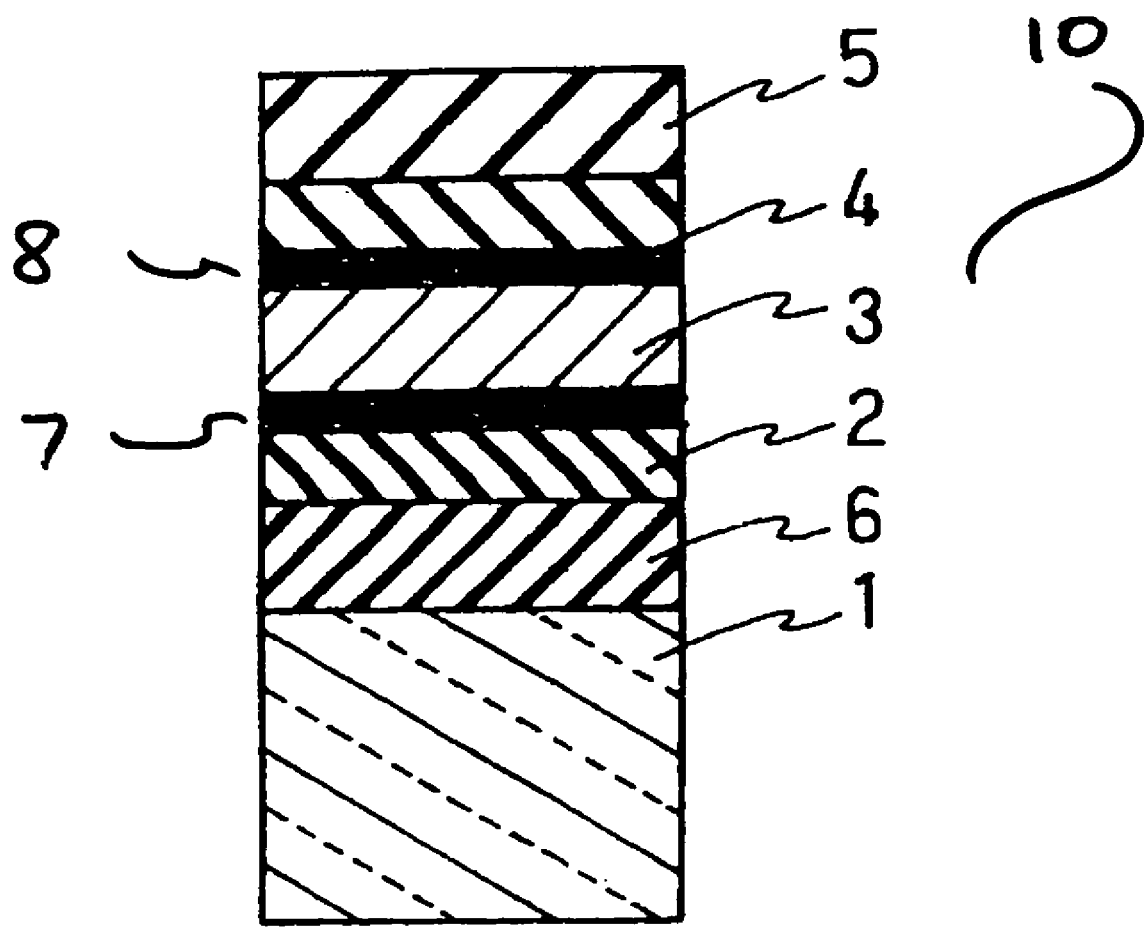
FIG. 4 is a cross sectional view of an optical recording medium in accordance with the invention.

Disclosed at 10 in FIG. 4 contained herein is one embodiment of an optical recording medium including a crystallizing layer. The embodiment shown in FIG. 4 includes a substrate 1, metallic or reflecting layer 6, dielectric layer 2, crystallizing layer 7, recording layer 3 comprised of a phase change material, crystallizing layer 8, dielectric layer 4 and protective layer 5. In this embodiment, the recording layer is in contact with two crystallizing layers. An analogous embodiment including only one crystallizing layer and embodiments including one or more crystallizing layers that are not in physical contact with the recording layer or combinations thereof also fall within the scope of the present invention.

The scope of the present invention extends to optical storage and retrieval systems that incorporate the phase change materials and optical recording media described hereinabove. Such systems typically include an optical drive with an optical head for reading, recording, overwriting and erasing data to and from an optical recording medium that includes one or more recording layers, at least one of which comprises a phase change material. The optical drive includes an optical source, preferably a laser, for inducing amorphization and crystallization of a phase change material. The phase change materials showing improved performance at blue or short wavelengths, energy storage layers, crystallization layers etc. described hereinabove may be included generally in optical stacks having one or more layers that may include protective layers, dielectric layers, reflective layers, substrates, etc.

Plasmon Lens

The instant inventors have created a plasmon lens that enhances the light-plasmon coupling strength beyond even what simple gratings produce. Moreover, terabit/in$^2$ storage densities will require apertures of about 30 nm. Even if 650 nm laser light is used, the required aperture is still more than 20× smaller than λ. Of course, use of grating momentum is not the only way photons can couple with plasmons. Another way can broadly be described by evanescent coupling. By combining both grating and evanescent coupling, the light-plasmon interaction strength can be elevated to perhaps the level enabling PC optical recording.

A set of experiments were conducted where the thickness of Al films varied from 20 to 128 nm, and were deposited on various substrates. These include ideally flat glass substrates, bare CD-RW and DVD-RW polycarbonate grooved substrates, as well as substrates containing Integrated Near-field Optics (INFO). The flat glass substrates provide the reference baseline for transmission through the Al films. The CD and DVD substrates provide references for "simple" 1-D flat gratings having 1.55 and 0.74 µm pitch, respectively. Finally, the INFO substrates consist of cylindrical nano-optic lenses having 0.37 µm diameter whose height modulates every other row (for an effective pitch also of 0.74 µm). To ensure conformal coating of the Al layer over these nano-optic structures, the deep profile features of the as-received disks were removed by slightly etching for 20 minutes in a UV/ozone treatment. SEM confirmed the conformality. The inventors have discovered that the more complex shape of the INFO samples is what enhances the evanescent coupling of light to plasmons (and vice versa).

FIGS. 5A-C depict the different sample types tested by the instant inventors, and Table I provides sample identification. Polarized reflectance and transmittance [R,T] measurements were made using a dual beam instrument, Perkin-Elmer Lambda 900 spectrophotometer, over the spectral range from 300 to 2500 nm. Two Glan-Thompson polarizing crystals were used, one in the instrument's reference beam, and the other in its sample beam. The transmission measurements were made at normal incidence with the sample roughly 50 cm away from the integrating sphere (60 mm diameter) detector. The reflection measurements were made at near normal incidence (8°) and the sample was directly mounted to the detector. In this case, the collection of reflected energy has an effective NA of from 0.90 to 0.95. Thus most diffracted light escapes when measuring [T], but only rays >64° escape when measuring [R]. The vertical and horizontal spatial dimension of the spectrometer's light beam is roughly 1 cm tall by 0.2 cm wide, respectively. The samples were oriented such that the grooves are substantially parallel to the vertical direction. Even so, we do not rely on this crude positioning for the sensitive polarization dependent measurements. After positioning the sample, we set the spectrometer's wavelength to a value were (based on some experience) we expect maximum sensitivity to different polarizations. At this wavelength, we then perform a polarization scan to determine the extreme conditions. Here, both polarizers are rotated between 10° and 330°. This allows the s- and p-directions to be determined to within a few degrees. In this work, the s- and p-polarizations are indentified with respect to the sample's groove direction. So that in the s-polarization, the light's electric field direction is perpendicular to the groove direction. Once determined, without moving the sample, the polarization crystals are rotated to the appropriate angle and at this angle, a wavelength scan is performed. One last comment concerns the reflectivity measurements. These are made relative to a first surface Al mirror. Raw reflectance data is then corrected for aluminum=s response using a correction determined by measurement of a certified specular reflectance standard. All scans were performed in 1 nm intervals at a constant 0.4 s integration time.

TABLE 1 shows sample specifications, where the Al layer contains 1.5 atomic % Ti. The dielectric layer is $(ZnS)_{0.8}(SiO_2)_{0.2}$ typically used in optical memory media. All layers are sputter deposited at room temperature. A 20 min UV/ozone etch was applied to the INFO substrates.

TABLE 1

| Sample Run ID | Substrate type | Layer(s) |
|---|---|---|
| o3112 | Fused silica glass (FSG) | 40 nm Al |
| o3314 | INFO | 20 nm Al |
| o3308 | INFO, CD-RW | 40 nm Al |
| o3313 | INFO | 60 nm Al |
| o3307 | INFO | 128 nm Al |
| o3387 | 7059 Glass, CD-RW, DVD-RW, INFO | 20 nm Al + 40 nm dielectric |

FIG. 6A shows the reflectance (R) and FIG. 6B shows the transmittance (T) data in both polarizations for light incident on the Al film (40 nm) side of a CD-RW sample (run o3308), as well as for unpolarized data of a reference sample (o3112) having the same nominal Al thickness—but on flat fused silica glass (FSG). As expected, [$R_p$] is rather featureless over most of the spectral range, comparing closely with the unpolarized [R] measurements on the flat FSG. For both [R,T] data of sample o3112, the broad feature centered near 850 nm is due to a transition between two different conduction bands in Al [16]. Both [$R_p$] and [$R_s$] of sample o3308 have a broad dip centered at 640 nm as well as a drop off below 400 nm. These dips mean that some light energy is lost—most likely by diffraction. Even though the sample is directly in contact with the integrating sphere detector (with effective 0.90 to 0.95 NA), diffracted energy at grazing angles to the surface will not be measured. For the transmission data, both [$T_p$] and [$T_s$] of sample o3308 are essentially identical, but somewhat below the [T] of the flat reference sample. Aluminum's interband absorption feature can be identified at 850 nm. However, [T] of the reference appears consistently about 0.1% greater than the polarized data of sample o3308. There are two reasons for this. Although their nominal Al thickness values are the same, the effective thickness of o3308 may be slightly greater. Moreover, much of the diffracted energy in o3308 is not measured due to the large sample B detector distance.

FIG. 6A shows the reflectance and FIG. 6B Shows the transmittance in p-[RTm1, blue] and s-polarizations [RTm2, green] for CD-RW sample, run o3308, Al thickness is 40 nm. Also shown for reference is unpolarized data for sample o3112 [RTc1, red] with 40 nm Al on flat FSG. In all cases, light is incident from the film side. A grating change occurs at 862 nm and accounts for the discontinuity in [R] and the noise in [T] at this location.

Clearly, the most profound difference in FIGS. 6A and 6B is in the [$R_s$] of sample o3308, where we find numerous sharp dips from 1840 nm to 680 nm and below. These dips represent loss of light energy into the detector. They represent both true absorption by excitation of surface plasmon (SP) resonances, as well as scattering away from the detector as in simple diffraction. Such SP features are commonly seen in metallic diffraction gratings [17] for s-polarization. Interestingly, the effect only weakly affect the transmission data: [$T_p$] and [$T_s$] are practically identical, except for a weak enhancement of [$T_s$] around 825 nm. This is the weak light-plasmon coupling case.

FIG. 7A shows the reflectance and FIG. 7B shows the transmittance in p-[Rm1, blue] and s-polarizations [Rm2, green] for INFO sample, run o3308, Al thickness is 40 nm. For reference the unpolarized data for sample o3112 [RTc1, red] with 40 nm Al on flat FSG is shown. In all cases, light is incident from the film side.

FIGS. 7A and 7B show what is believed to be a strong light-plasmon coupling case. Here, in the same deposition run (o3308), a 40 nm Al film was deposited over the nano-optic elements of the INFO substrate. Since the pitch of this substrate is now 740 nm (compared to 1500 nm of the CD-RW substrate), the first plasmon resonance in [$R_s$] is now much higher in energy, centered near 915 nm. Moreover, compared to [$R_s$] of the CD-RW substrate, here the depth of the resonant absorption is significantly greater. The absorption is now so great that it significantly impacts the transmission data. The [$T_s$] data for the INFO substrate has two significant peaks centered at 875 nm and 436 nm, whose amplitudes are 1.9% and 2.3%, respectively, representing from 4 to 5× greater transmission at these locations than a flat Al film of comparable thickness. There is also a minor peak at 580 nm. Coatings on these UV/ozone treated INFO substrates are conformal as confirmed by SEM, so the enhanced transmission seen here is not a result of small apertures. The fact that we measure such large transmission peaks even though the sample B detector distance is quite long (50 cm), demonstrates that light is selectively enhanced in the forward direction (i.e., normal to the plane of the substrate). Also of some interest are the valleys at 1155 and 650 nm. These are due to Wood's anomalies. In contrast to the s-polarization, both [$R_p$, $T_p$] are essentially the same as for the CD-RW substrate.

Thus, the data indicates that the best structure for a plasmon lens is something like that depicted in FIGS. 8A (side view) and 8B (bottom view). The lens is preferably created on an optically transparent substrate 100 formed from a polymer such as, for example, polycarbonate or t. The light incident surface thereof is flat while the opposite side is imprinted with the plasmon creating surface shape. Onto the substrate 100 is deposited a metal film 101 produced of for example aluminum or silver (other metals may also be used). The surface shape contains concentric rings which are separate by a distance 102. The distance 102 is the measure of the surface path length from one feature to the next. This surface path length 102 is the distance along the surface between the peaks/valleys of the concentric rings. The surface path length 102 distance is the same the wavelength of the coupled light. Thus, the surface path length should be set to couple the desired light wavelength. Preferably the surface path length 102 will be set to use conventional red (830 nm) or blue (650 nm) laser light wavelengths or even shorter wavelength such as 430 nm. In the center of the lens is an aperture 104. The size of the aperture is dependent upon the size of the recorded mark desired on the data recording medium. The size may range from 150 nm all the way down to 20 nm, with 30 nm being useful to increase capacity of optical disks to the terabit per square inch range.

The shape of the concentric surface features of the instant inventive plasmon lens is very important in creating the desired light-plasmon coupling. The surface features vary regularly in height and preferably form a sinusoidal pattern or a combination of multiple sinusoidal patterns that form a Fourier series.

While the invention has been illustrated in detail in the drawings and the foregoing description, the same is to be considered as illustrative and not restrictive in character, it is understood that only the preferred embodiments have been shown and described fully and that all changes and modifications that come within the spirit of the invention are desired to be protected.

We claim:

1. An optical data storage and retrieval system comprising:
   an optical drive with an optical head for reading, writing, overwriting and erasing optical data to and from an optical recording medium, said optical recording medium having one or more recording layers, at least one of said recording layers comprising an phase change material reversibly transformable between a first detectable state and a second detectable state by the providing of energy;
   a first energy source for providing energy to said phase change material, said first energy source providing insufficient energy to effect said reversible transformation; and
   a second energy source for providing energy to said phase change material, said second energy source providing insufficient energy to effect said reversible transformation
   wherein the combined energy provided by said first and second energy sources is sufficient to effect said reversible transformation.

2. The optical data storage and retrieval system of claim 1, wherein said first detectable state is a crystalline or partially crystalline state and said second detectable state is a substantially amorphous state.

3. The optical data storage and retrieval system of claim 1, wherein said first energy source is a laser.

4. The optical data storage and retrieval system of claim 3, wherein said laser is operated at a wavelength of not more than 430 nm.

5. The optical data storage and retrieval system of claim 3, wherein said laser is operated at a wavelength of not more than 400 nm.

6. The optical data storage and retrieval system of claim 3, wherein said second energy source is an electrical energy source.

7. The optical data storage and retrieval system of claim 3, wherein said second energy source is a laser.

8. An optical data storage and retrieval system comprising:
   an optical drive with an optical head for reading, writing, overwriting and erasing optical data to and from an optical recording medium, said optical recording medium having one or more recording layers, at least one of said recording layers comprising an phase change material reversibly transformable between a first detectable state and a second detectable state by the providing of energy, said optical recording medium having conductive regions; and
   a magnetic field,
   wherein said magnetic field induces a current in said conductive regions, said current producing electrical energy, said electrical energy being provided to said phase change material.

9. The optical data storage and retrieval system of claim 8, wherein said first detectable state is a crystalline or partially crystalline state and said second detectable state is a substantially amorphous state.

10. The optical data storage and retrieval system of claim 8, wherein said conductive regions are in the form of conductive layers contained within said optical recording medium.

11. The optical data storage and retrieval system of claim 8, wherein said conductive regions are in the form of one or more conductive wires.

12. The optical data storage and retrieval system of claim 8, wherein said conductive regions are in physical contact with said phase change material.

13. The optical data storage and retrieval system of claim 8 further comprising a laser, said laser providing energy to said phase change material.

14. The optical data storage and retrieval system of claim 13 wherein the energy provided by said laser is insufficient to effect a transformation between said first detectable state and said second detectable state in the absence of said electrical energy.

15. The optical data storage and retrieval system of claim 13, wherein said laser operates at a wavelength of not more than 430 nm.

16. The optical data storage and retrieval system of claim 8, wherein said optical recording medium further comprises circuitry, said circuitry receiving as input said current, said circuitry producing an electrical signal in response to said current.

* * * * *